United States Patent [19]

Borlaug

[11] 4,215,363
[45] Jul. 29, 1980

[54] GATED, VARIABLE-GAIN AMPLIFIER

[75] Inventor: David J. Borlaug, Elba, N.Y.

[73] Assignee: GTE Products Corporation, Stamford, Conn.

[21] Appl. No.: 973,790

[22] Filed: Dec. 26, 1978

[51] Int. Cl.² ............................................. H04N 9/537
[52] U.S. Cl. .................................. 358/21 R; 358/21 V
[58] Field of Search ................. 358/21 V, 27, 40, 174; 325/397, 400, 399, 404; 330/254; 307/264

[56] References Cited

U.S. PATENT DOCUMENTS 3,109,989  11/1963  Mair .................................. 325/404 X Primary Examiner—Robert L. Richardson
Attorney, Agent, or Firm—John A. Odozynski

[57] ABSTRACT

A variable gain amplifier controlled by alternate sources of gain-control signal. A first, substantially, constant, source has an amplitude corresponding to the amplifier's maximum gain condition. A second, variable, source allows the amplifier gain to be continuously varied. In a chrominance amplifier for a television receiver, the continuously variable source is normally selected so as to develop the desired chrominance level. During the reception of a VIR signal, the constant source is selected so as to effect the maximum amount of VIR correction. The gain-control sources are switched, via analog gates, through substantially identical filter-decoupling networks.

10 Claims, 1 Drawing Figure

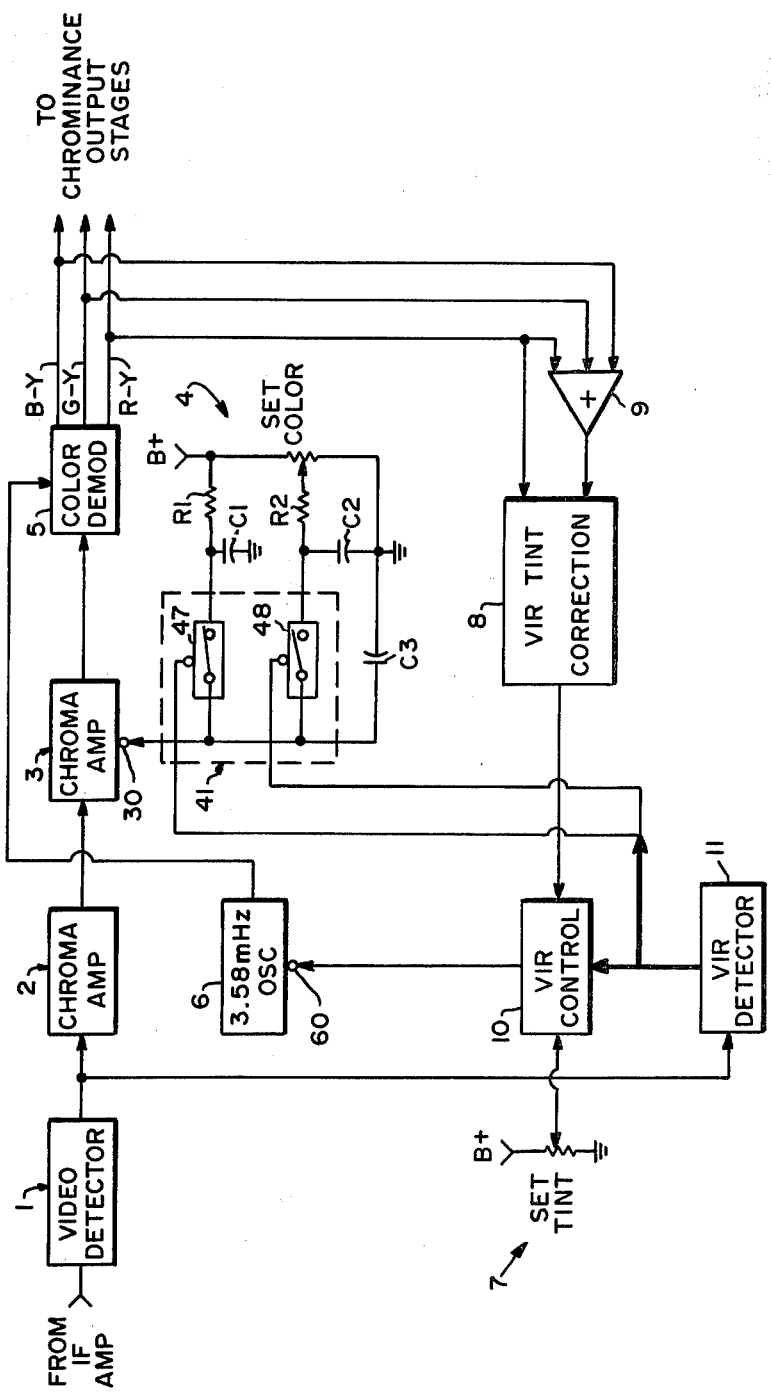

GATED, VARIABLE-GAIN AMPLIFIER

FIELD OF THE INVENTION

This invention relates to gain-controlled amplifiers and more particularly to a chrominance amplifier that operates at maximum gain during the reception of a VIR reference signal and according to a continuously variable control voltage otherwise.

BACKGROUND OF THE INVENTION

Many color television receivers are currently equipped with circuitry for processing the Vertical Interval Reference (VIR) signal transmitted during line 19 of each vertical interval (frame). In short, the nominal 63μ sec VIR signal is comprised of a nominal 24μ sec chrominance reference segment, a nominal 12μ sec luminance reference segment, and a nominal 12μ sec black level reference segment. The VIR signal is so constructed that when the regenerated chrominance subcarrier is properly phased the (R-Y) output of chrominance demodulator during the chrominance segment of the VIR interval will be at a zero reference level, that is, at the black level. Consequently, the (R-Y) output and the black reference can be used in a closed control loop including the subcarrier oscillator to maintain the desired phasing of the oscillator and, hence, desired chrominance tint control. In general, a difference between the amplitude of the R-Y signal and the amplitude of the black reference signal will be detected and used to develop an appropriate tint error correction voltage. According to well-known techniques, this voltage is then applied to the chrominance subcarrier oscillator in a manner that will compensate for phase errors that may have occurred during transmission or signal processing. However, it is axiomatic that the amount of error correction that can be effected depends on the level of error correction signal developed and, hence, on the signal level at the output of the color demodulator. This signal level is established by, inter alia, the RF signal level at the input to the television receiver as well as the gain of the chrominance channel. The chrominance channel typically includes at least one amplifier having a manually or otherwise variable gain control for effecting the viewer-preferred chrominance level (saturation) in the reproduced color image. Accordingly, at low RF input signal levels or at particular settings of the chrominance level control, less than optimum tint error correction may be provided by the VIR sensitive tint control circuitry.

OBJECTS OF THE INVENTION

It is an object of this invention to provide a chrominance amplifier having continuously variable gain during standard signal conditions.

It is a further object of this invention that the amplifier operate at or near maximum gain during the reception of a VIR signal.

It is a further object of this invention that the amplifier be capable of substantially instantaneous, glitch-free switching from continuously-variable to maximum-gain operation.

SUMMARY OF THE INVENTION

The above and other objects and advantages are achieved in one aspect of this invention by a gated, variable gain circuit which comprises an amplifier operating in response to the signal applied to its gain-control terminal. The circuit also comprises alternate sources of gain-control signal coupled to the terminal by a gain switching means. The gain switching means is responsive to prescribed operating conditions, thereby determining which source of gain-control signal is coupled to the terminal.

BRIEF DESCRIPTION OF THE DRAWING

The sole drawing is a schematic diagram, partially in block form, of the subject gated, variable-gain amplifier.

DESCRIPTION OF THE PREFERRED EMBODIMENT

For a better understanding of the present invention, together with other and further objects, advantages and capabilities thereof, reference is made to the following disclosure and appended claims in connection with the above-described drawing.

Referring now to the drawing, in a conventional manner the output of the IF amplifier (not shown) is coupled to the input of the video detector 1. The demodulated composite video signal is coupled to the input of a first, fixed-gain, chrominance amplifier 2 and the output of that amplifier is coupled to the input of a second, variable-gain, chrominance amplifier 3. The gain of amplifier 3 is determined by the voltage applied to its gain-control terminal 30 by the gain control network 4, the operation of which will be detailed below. The output of amplifier 3 is coupled to one input of the color demodulator 5. The other input to demodulator 5 is supplied by the 3.58 MHz chrominance reference oscillator 6. The frequency of reference oscillator 6 is typically locked to the frequency of the subcarrier signal received during the chrominance burst period occurring during horizontal retrace. The phase relationship between the reference oscillator 6 and the chrominance subcarrier is established, according to any one of a number of known techniques, by the voltage applied to terminal 60. As will be apparent, this voltage, i.e., tint control voltage may be derived either from a manually variable SET TINT potentiometer 7 coupled between a voltage supply B+ and ground or from a VIR Tint Correction circuit 8. As is well known, the phase relationship between the reference oscillator 6 and the subcarrier signal determines the relative amplitudes of the B-Y, G-Y, and R-Y outputs of the color demodulator and, for given chrominance output amplifier (not shown) drive and CRT screen settings, the tint characteristics of the reproduced image.

Although not strictly necessary for an understanding of this invention, a brief discussion of the operation of the VIR Tint Correction circuit may be helpful. As indicated above, during the reception of a VIR signal, proper phasing of the reference oscillator 6 will be manifest by a voltage level at the R-Y output of the demodulator during the chrominance reference part of the VIR signal that is equal to the luminance level, as reconstructed from the individual B-Y, G-Y and R-Y outputs by the matrixing network 9, during the black reference level segment of the VIR signal. These signals are appropriately processed by the Tint Correction circuit 8 and coupled to one input of the VIR control circuit 10. This circuit operates, in response to the VIR detector 11, to couple the output of the tint correction circuit to the reference oscillator during the reception of signals containing VIR information and, when VIR signals are not received, to alternatively couple the manual SET TINT potentiometer to the oscillator. Because operation of the tint correction circuitry is enhanced according to the signal levels available at the output of the demodulator, it is normally desirable that these signals be at their maximum amplitudes during the reception of a VIR signal. Such operation is assured by the gain-control network 4.

Network 4 includes a complementary gate 41 having a first input coupled to a first filter-decoupling network 42, a second input coupled to a second filter-decoupling network 43, and an output coupled to the gain-control terminal 30 of chroma amplifier 3. The complementary gate is constructed from first and second CMOS analog gates, 47 and 48 respectively, having inputs respectively coupled to networks 42 and 43, control terminals coupled to the VIR detector 11, and outputs connected in common to terminal 30 and coupled by a capacitor C3 to a reference potential, in this case ground. Network 42 includes a resistor R1, coupled between the input of gate 47 and B+, and a capacitor C1, coupled between that input and ground. Network 43 includes a resistor R2, coupled between the input of gate 48 and the wiper of a manually variable SET COLOR potentiometer 12, and a capacitor C2, coupled between that input and ground. Potentiometer 12 is coupled between B+ and ground.

Operation of the gain-control network is as follows. In the absence of a VIR signal, the detector 11 will provide a voltage of logic ONE to the control terminal of the gate 48 and a complementary, logic ZERO, voltage to the corresponding control terminal of gate 47. Gate 47 will be open-circuited, gate 48 close-circuited, and the gain of amplifier 3 determined by the setting of the SET COLOR potentiometer according to viewer preference.

During the reception of a VIR signal, the detector will provide a logic ONE level voltage at the control terminal of gate 47 and a logic ZERO level voltage at the corresponding control terminal of gate 48. Gate 47 will be close-circuited, gate 48 open-circuited and the gain of amplifier 3 is established by the voltage, B+, coupled through network 42 to terminal 30. In practice B+ is chosen to have a value, for example, 12 volts, sufficient to assure that amplifier 3 is operating at maximum gain during the reception of a VIR signal.

In addition to assuring optimum performance of the VIR tint correction circuitry by affording maximum gain in the chrominance channel, network 4 allows substantailly instantaneous switching from variable-gain to maximum-gain operation of amplifier 3. This is preferable to circuitry which would, for example, include only a single filter-decoupling network and then directly switch the input to that network. In such a scheme the voltage applied to the filter-decoupling network would be switched from the wiper of the SET COLOR potentiometer during normal operation to B+ during the reception of a VIR signal. However, this type of system imposes severe restrictions on the length of the time-constant associated with the filter-decoupling network. To wit, in order to achieve the required amount of filtering and decoupling of the gain-control voltage, this network may necessarily be characterized by a time constant approaching the duration of the VIR interval, 63μ sec. This would be the case given values, actually encountered, of R1 and R2 equal to 27 K ohm and values of C1 and C2 equal to 3 μF. It is obvious that time-constants of this length would largely obviate the advantages to be achieved in switching the gain-control voltage. The subject invention inherently circumvents this difficulty. In addition, C3 has been included to suppress any switching transients (glitches) that may occur. Its value is sufficiently small, 0.0047 UF, so as to have a negligible effect on the R1-C1, R2-C2 time constants.

Finally, although the subject invention has been described in conjunction with a variable-gain chrominance amplifier, it is clear that this circuit has applicability with gain-controlled circuitry in other areas of the television receiver as well as with gain-controlled circuits generically.

Accordingly, while there has been shown and described what are at present considered the preferred embodiments of the invention, it will be obvious to those skilled in the art that various changes and modifications may be made therein without departing from the scope of the invention as defined by the appended claims.

What is claimed is:

1. A gated, variable gain circuit comprising:
   a gain-controlled amplifier having an input coupled to a source of signals and having a gain-control terminal, the amplifier gain being determined by the control signal applied to the gain-control terminal;
   a first source of substantially constant gain-control signal;
   a second source of variable gain-control signal;
   gain switching means coupled to the gain-control terminal and to the first and second sources of gain-control signal and responsive to a signal indicative of a prescribed operating condition so that under the prescribed operating condition the gain-control terminal is coupled to the first source of gain-control signal and under other operating conditions the gain-control terminal is coupled to the second source of gain-control signal.

2. A circuit as defined in claim 1 wherein the gain-switching means comprises a first analog gate coupled between the gain-control terminal and the first source of gain-control signal and a second analog gate coupled between the gain-control terminal and the second source of gain-control signal, said gates coupled to the signal indicative of the prescribed operating condition so that under that condition the first gate is one state of conductivity and the second gate is in the opposite state of conductivity.

3. A circuit as defined in claim 2 wherein the first source of gain-control signal comprises:
   a voltage supply;
   a first fixed resistance coupled between the voltage supply and one end of the first analog gate; and
   a first capacitance coupled to the junction formed the first fixed resistance and by the first analog gate and to a reference potential.

4. A circuit as defined in claim 3 wherein the second source of gain control signal comprises:
   a voltage supply;
   a variable resistance coupled between the voltage supply and the reference potential;
   a second fixed resistance coupled between the wiper of the variable resistance and one end of the second analog gates; and
   a second capacitance coupled to the junction formed by the second fixed resistance and by the second analog gate and to the reference potential.

5. A circuit as defined in claim 4 wherein the respective other ends of the analog gates are coupled:
(a) to each other,
(b) to the gain-control terminal, and
(c) through a third capacitance to the reference potential.

6. A circuit as defined in claim 5 wherein the capacitance value of the third capacitance is at least two orders of magnitude less than the values of the first and second capacitances.

7. A chrominance circuit responsive to a VIR signal, said circuit comprising:
a variable-gain amplifier having an input coupled to a chrominance signal including a VIR component and having a gain-control terminal;
gain selecting means having an output coupled to the gain-control terminal for selectively establishing the gain of the variable-gain amplifier in response to a signal indicating the presence or absence of the VIR signal;
a first source of gain-control signal coupled to a first input of the gain-selecting means; and
a second source of gain-control signal coupled to a second input of the gain-selecting means, whereby during the absence of a VIR signal the first source is coupled through the gain-selecting means to the gain-control terminal and during the presence of the VIR signal the second source is coupled through the gain-selecting means to the gain-control terminal.

8. A chrominance circuit as defined in claim 7 wherein the first source of gain-control signal comprises a manually variable resistance coupled between a voltage supply and a reference potential and having a wiper coupled to the first input of the gain-selecting means so that a continuously variable amount of chrominance gain is effected during the absence of the VIR signal.

9. A chrominance circuit as defined in either claim 7 or claim 8 wherein the second source of gain-control signal comprises a fixed resistance coupled between a voltage supply and the second input of the gain-selecting means so that a maximum amount of chrominance gain is effected during the presence of the VIR signal.

10. A chrominance circuit as defined in claim 7 wherein the gain-selecting means comprises a first impedance coupled between the gain-control terminal and the first source of gain-control signal and a second impedance coupled between the gain-control terminal and the second source of gain-control signal, said impedances exhibiting opposite states of conductivity whereby the first impedance effects a high resistance condition during the presence of a VIR signal and a low resistance condition otherwise.

* * * * *